US009338863B2

(12) United States Patent
Ghoshal

(10) Patent No.: US 9,338,863 B2
(45) Date of Patent: May 10, 2016

(54) SENSOR ARRANGEMENT FOR CONTROLLING ROOM LIGHTING, SENSOR NETWORK FOR CONTROLLING ROOM LIGHTING AND METHOD FOR CONTROLLING ROOM LIGHTING

(71) Applicant: ams AG, Unterpremstaetten (AT)

(72) Inventor: Sajol Christopher Ghoshal, Austin, TX (US)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 14/576,032

(22) Filed: Dec. 18, 2014

(65) Prior Publication Data

US 2015/0181662 A1 Jun. 25, 2015

Related U.S. Application Data

(60) Provisional application No. 61/919,019, filed on Dec. 20, 2013.

(30) Foreign Application Priority Data

Dec. 27, 2013 (EP) .................................... 13199684

(51) Int. Cl.
*H05B 37/02* (2006.01)
*H05B 33/08* (2006.01)
*G01J 1/42* (2006.01)

(52) U.S. Cl.
CPC ........... *H05B 37/0272* (2013.01); *G01J 1/4204* (2013.01); *H05B 33/0803* (2013.01); *H05B 37/0218* (2013.01)

(58) Field of Classification Search
None
See application file for complete search history.

(56) References Cited

U.S. PATENT DOCUMENTS

| 2010/0026195 A1* | 2/2010 | Potter .......................... 315/158 |
| 2011/0006188 A1 | 1/2011 | Lin |
| 2012/0025717 A1* | 2/2012 | Klusmann et al. ............ 315/152 |
| 2012/0050307 A1* | 3/2012 | Mahowald et al. ........... 345/590 |

FOREIGN PATENT DOCUMENTS

WO 95/12186 A1 5/1995

* cited by examiner

*Primary Examiner* — Jany Richardson
(74) *Attorney, Agent, or Firm* — McDermott Will & Emery LLP

(57) ABSTRACT

A sensor arrangement for controlling room lighting comprises a light sensor and a controller. The light sensor is arranged for both detecting an ambient light level and for detecting a remote signal to be emitted by a remote control unit. A detection signal is providing at a sensor terminal and is indicative of the ambient light level and indicative of the remote signal. The controller comprises an input terminal connected to the sensor terminal and comprises a controller means to generate a control signal depending on the detection signal to control a light source to be connected at an output terminal.

16 Claims, 3 Drawing Sheets

SENSOR ARRANGEMENT FOR CONTROLLING ROOM LIGHTING, SENSOR NETWORK FOR CONTROLLING ROOM LIGHTING AND METHOD FOR CONTROLLING ROOM LIGHTING

CROSS-REFERENCE TO RELATED APPLICATIONS

The present application claims the benefit of priority under 35 U.S.C. §119 from U.S. Provisional Patent Application Ser. No. 61/919,019, filed on Dec. 20, 2013, and claims priority to European Patent Application No. 13199684.5 filed on Dec. 27, 2013, both disclosures of which are hereby incorporated by reference in their entirety for all purposes.

DESCRIPTION

This application relates to a sensor arrangement for controlling room lighting, a sensor network for controlling room lighting and a method for controlling room lighting.

BACKGROUND

Today lighting is manually controlled by on/off switches or by reducing the light output via a dimmer switch. Typically, lamps and light bulbs have no mechanism to sense the amount of light being put out and hence are unable to adjust their output lumens to meet a targeted lighting for a room or workspace.

Recently, ambient light sensing technology has become popular in display management, e.g. dimming or brightness control with the purpose of reducing power consumption, extending battery life, and providing an adapted viewing in diverse lighting conditions. Ambient light sensing devices approximate the human eye response to light under a variety of lighting conditions. The devices have a wide range of performance allowing accurate measurements in lighting environments ranging from low-light to bright sunlight. There have been first attempts on applying ambient light sensing devices in lightning control. These systems, however, lack a user-friendly control interface which renders control of room lightning both easy and flexible.

It is an object to provide a sensor arrangement for controlling room lighting, a sensor network for controlling room lighting and a method for controlling room lighting which address the above discussed issues.

This object is solved by the subject matter of the independent claims. Further developments and embodiments derive from the dependent claims.

SUMMARY

A sensor arrangement for controlling room lighting comprises a light sensor and a controller. The light sensor is arranged for detecting an ambient light level, in particular, a photopic and/or scotopic ambient light level (AL), and is also arranged for detecting a remote signal. The controller comprises an input terminal which is connected to a sensor terminal of the light sensor. The controller comprises a controller means to generate a control signal to control a light source to be connected at an output terminal of the controller.

In operation of the sensor arrangement the light sensor detects an ambient light level and provides at the sensor terminal a detection signal indicative of the ambient light level. Eventually, the light sensor also detects a remote signal emitted by the remote control unit. The detection signal provided by the light sensor is also indicative of the remote signal.

The controller receives the detection signal provided by the light sensor at its input terminal. The controller means is arranged to generate the control signal depending on the detection signal. The detection signal can then be used to control the light source to be connected at an output terminal of the controller.

The sensor arrangement allows for easy controlling room lighting at reduced cost. The same light sensor is used as a receiver for the remote signal and as ambient light sensor, thus saving money and providing the added benefit that the light sensor can be close to a light fixture. When the light sensor is close to the light fixture, it gives a more accurate reading allowing for better accuracy and granularity in controlling light. Furthermore, the implementation of the sensor arrangement for controlling room lighting render switches, typically attached to the wall of a room, unnecessary since the light source(s) are controlled by the remote control unit. The user can adjust the lighting while remaining seated. Additionally, the user can turn the light source on and off, dim the light source, or have access to additional functionality like control of a television set and a ceiling fan with a single remote control. This added functionality renders room lighting both easy and more flexible.

In an embodiment of the sensor arrangement the detection signal comprises a light signal portion and a remote signal portion. The light signal portion is indicative of the ambient light level whereas the remote signal portion is indicative of the remote signal.

The detection signal comprises both the light signal portion and the remote signal portion and the controller is arranged to separate and further process the two signal portions. Both signal portions, however, may not be present all the time. For example, the remote signal is transmitted by the remote control unit. When there is no user interaction, i.e. no transmission of the remote signal, consequently there is no information in the detection signal other than that remote control is idle.

The actual data structure of the detection signal can be implemented in various ways. In one possibility the light signal portion and the remote signal portion are detected as two separate channels and the sensor terminal comprises two channel sub-terminals, respectively. In another way the detection signal is a superposition of the light signal portion and the remote signal portion which can be interpreted and separated by the controller. Yet another way is to record the light signal portion and the remote signal portion as two separate but consecutive data streams. The two portions can have characteristic data structure in order to distinguish them. For example, the remote signal portion could have a data structure according to the I²C standard. The separate channels or signals can be distinguished in a time multiplex manner, for example by means of a mixer.

According to an embodiment of the sensor arrangement, the light sensor comprises a first sensor means and a second sensor means. The first sensor means is sensitive to visible light and generates the light signal portion. The second sensor means is sensitive to infrared light, e.g. to be emitted by the remote control unit, and generates the remote signal portion.

The term "sensor means" is used in a broad way. For example, the light sensor can be a single sensor element which has different areas which are sensitive to different wavelengths. Or, in a similar way, different areas may be covered by different filters. Signals from these different areas can unambiguously be correlated to the respective portion in the detection signal, i.e. establish the light signal portion and the remote signal portion, respectively. An example for such kind of light sensor is a CCD or CMOS. However, the sensor means can also relate to separate sensor elements giving rise to separate channel signals which then relate to the light signal portion and the remote signal portion, respectively. An example for such kind of light sensor is a photo element, photo-diode or avalanche diode.

In a further embodiment of the sensor arrangement, the first sensor means comprises an array of photo-diodes and the second sensor means comprises an infrared photo-diode or an array of infrared photo-diodes.

In another embodiment of the sensor arrangement, the controller means is arranged to adjust a light output of the light source depending on the ambient light level and with respect to a target value. Furthermore, the controller means, alternatively or in addition, is arranged to adjust control parameters of the light source depending on the remote signal. In particular, the controller means is arranged to adjust the target value, a colour temperature and/or control parameter pre-sets.

In a certain sense the sensor arrangements has two modes of operation. During the main mode the controller automatically controls the light source to maintain the conditions defined during a mode of user interaction set by means of the control parameters. In more detail, the light sensor detects the ambient light level which includes an amount of light being put out by the light source and then adjust the output lumens to meet the target value for lighting of the room or workspace. Thus, there is a feedback from the light sensor which can be located close to the light source.

The same light sensor used to maintain the luminosity of the light output is also arranged for communicating with the remote control unit by means of detecting the remote signal. The remote signal comprises a certain data structure which can be interpreted by the controller, i.e. the controller means. The remote signals encodes the control parameters which are then set by the controller and provided at the light source via the output terminal. For example, a user can set the target value to which the light output or intensity is adjusted. Furthermore, control parameters can define colour temperature. Control parameters can also be combined into control parameter pre-sets like predefined or programmable light levels under different lighting conditions, room occupancy being triggered or sunlight being sensed.

In another embodiment of the sensor arrangement, the controller means comprises a micro-controller and/or control logic.

In another embodiment of the sensor arrangement, the controller means comprises a driver circuit for light-emitting diodes. The light source comprises a light-emitting diode or an array of light-emitting diodes. In particular, array of light-emitting diodes may comprise light emitting diodes of different spectral properties, e.g. emitting different colours. The light emitting diodes can be controlled by means of a further control signal which derives from the control signal generated by the controller means and not only allows adjusting light intensity but setting colour temperature. A convenient way to implement this functionality is to use a modulated control signal, e.g. a pulse-width modulation.

In another embodiment of the sensor arrangement, the light sensor and the controller are integrated into a common module. The common module can be placed in close vicinity to the light source resulting in more accurate reading allowing for better accuracy and granularity in controlling the light.

In another embodiment of the sensor arrangement, the arrangement further comprises a proximity sensor connected to the controller. The proximity sensor is arranged for providing a proximity signal at the sensor terminal. The controller is then arranged to adjust the control parameters also depending on the proximity signal.

The proximity signal indicates occupancy of a room to be lighted. The control of room lighting can distinguish whether any person is in the room or not. Accordingly, light can automatically be switched on or off. The proximity sensor can be integrated into the common module as well. The proximity sensor typically comprises a light emitter to emit a proximity signal which, in turn, can be detected by means of the light detector after being reflected by objects or surfaces in the room.

A sensor network for controlling room lighting comprises a plurality of sensor arrangements according to the principles discussed above. In the sensor network the controller of each individual sensor arrangement comprises a communication means which is arranged for bidirectional communication within the plurality of sensor arrangements.

The communication means establish bidirectional communication between the individual sensor arrangements. If one sensor arrangement out of the plurality of sensor arrangements detects the remote signal and control parameters are set or changed, this information is broadcasted to the other sensor arrangements out of the plurality of sensor arrangements. This way the control parameters can be set at each individual sensor arrangement. It is also convenient that the ambient light level detected at each sensor arrangement is shared among the network. For example, a sensor arrangement detects a different ambient light level and adjusts the light output of a light source. Then a neighbouring sensor arrangement will eventually detect an increased ambient light level as well and so on. In order to keep the system stable and balanced, preferably, the network of sensor arrangements comprises a master-slave architecture.

In an embodiment of the sensor network, the communication means comprises a light communication interface, a Bluetooth interface, a wireless local area network interface and/or a universal serial bus.

The communication between the individual sensor arrangements can be implemented in different ways. The light communication offers one convenient way as the light sensors are already present and can be used for communication purposes as well. Light communication employs the light detector for detection of a light communication signal and the proximity sensor for emission of the light communication signal.

Additionally, the light communication interface comprises a light emitter connected to a communication terminal of the controller. The light emitter is arranged to emit a communication signal, in particular a light communication signal which can be detected by the light sensors. For example, the light emitter emits infrared light which can be detected by the light sensor without being noticeable by the human eye. This technique will be denoted invisible light communication hereinafter. Preferably, a 1 MHz modulation or higher is used to avoid interference. The range typically lies at 6 m. Preferably, the light emitter from the proximity sensor is used for this purpose. The invisible light communication can be implemented as a mesh network including master-slave dependencies as indicated above.

A method for controlling room lighting comprises the step of detecting an ambient light level, in particular, a photopic and/or scotopic ambient light level (AL), and detecting a remote signal to be emitted by a remote control unit using a light sensor. In another step a detection signal is generated which is indicative of the detected ambient light level and also indicative of the detected remote signal. Finally, the detection signal is provided at a controller which generates a control signal depending on the detection signal. The detection signal is used to control a light source to be connected to the controller.

The method allows for easy controlling room lighting at reduced cost. The same light sensor is used as a receiver for the remote signal and as ambient light sensor, thus saving money and providing the added benefit that the light sensor can be close to a light fixture. When the light sensor is close to the light fixture, it gives a more accurate reading allowing for better accuracy and granularity in controlling light. Furthermore, the implementation of the sensor arrangement for controlling room lighting render switches typically attached to the wall of a room unnecessary since the light source(s) are controlled by the remote control unit. The user can adjust the lighting while remaining seated. Additionally, the user can turn the light source on/off, dim the light source, or have access to additional functionality like control of a television set and ceiling fan with a single remote control. This added functionality renders room lighting both easy and more flexible.

In an embodiment the method also comprises a step of adjusting a light output of the light source depending on the light signal portion with respect to a target value. In addition, or alternatively, control parameters are adjusted to the light source of the light source depending on the remote signal portion, in particular adjusting the target value, a colour temperature and/or control parameter pre-sets.

In a further embodiment, the control parameters are also adjusted depending on a proximity signal received from a proximity sensor and provided at the controller.

In another embodiment, the control parameters are either received or broadcast to further controllers coupled to the controller by means of a network designed for a bidirectional communication to the at least one further controller (2), in particular designed for a visible light communication, an infrared light communication, communication via Bluetooth, a wireless local area network, and/or a universal serial bus. Preferably, the control parameters are either received or broadcast to further controllers via (infrared) light communication. Light communication employs the light detector for detection of a light communication signal and the proximity sensor for emission of the light communication signal. This way the controllers can autonomously share the control parameters and adjust to the lighting conditions.

BRIEF DESCRIPTION OF THE DRAWINGS

In the following, the principles introduced above will be described in more detail with respect to drawings in which an exemplary embodiments are presented.

DETAILED DESCRIPTION

Figure 1:
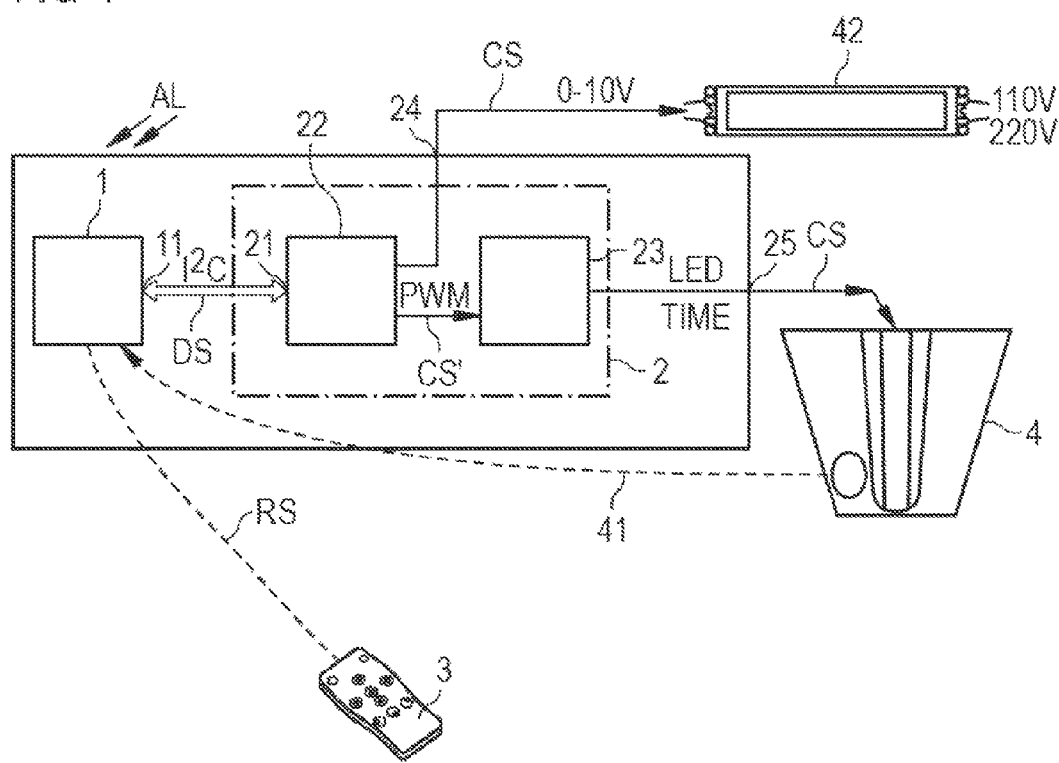
FIG. 1 shows an embodiment of a sensor arrangement for controlling room lighting.

FIG. 1 shows an embodiment of a sensor arrangement for controlling room lighting. The sensor arrangement comprises a light sensor 1 and a controller 2 which are integrated into a common module. The module can be associated with or integrated into a light source 4 or light flexure as indicated by an arrow 41 in the drawing. Alternatively, the sensor arrangement can be placed anywhere in a room or distributed as part of a network of several sensor arrangements.

The light sensor 1, or ambient light sensor, comprises a sensor terminal 11 which is connected to an input terminal 21 of the controller 2. The controller 2 further comprises a first and second output terminal 24, 25 which can be directly connected to the light source 4 or via a dimming ballast 42, respectively. The controller 2 comprises a controller means 22 coupled to a driver circuit 23 which is connected to the first output terminal 25.

Preferably, the light sensor 1 comprises a first sensor means being sensitive to visible light and a second sensor means being sensitive to infrared light. This can be implemented as an array of photo-diodes and an array of infrared photo-diodes, respectively. Infrared photo-diodes are diodes sensitive to infrared light (IR), i.e. electromagnetic radiation having a wavelength bigger than 700 nm. Typical examples include photo-diodes with a spectral range of 0.7 to 2.6 μm (Indium gallium arsenide (InGaAs)) and 0.8 and 1.7 μm (Germanium photo-diodes). Common photo-diodes with spectral sensitivity between 400 and 700 nm can be used as these elements typically are sensitive in the IR as well. But in this case the photo-diodes have to be used with some sort of spectral selector like a filter to assure that only IR is detected. Filters are typically used with the photo-diodes as well to approximate the human eye response to light under a variety of lighting conditions. In particular, the filters can have photopic or scotopic transmission characteristics. This allows the light sensor 1 to generate a detection signal DS which mimics human vision (photopic) and/or mimics human vision during dim lighting conditions (scotopic).

Generally, the light sensor 1 is arranged for detection of both an ambient light level AL and a remote signal RS eventually emitted by a remote control unit 3. In this particular embodiment, the light remote signal RS is to be transmitted by an infrared remote control unit. Typically, the remote signal RS is digital and comprises information that can be used to adjust control parameters of the light source 4 connected to the sensor arrangement by means of the driver circuit 23.

In particular, the light sensor 1 provides the detection signal DS at its sensor terminal 11. The detection signal DS has a light signal portion indicative of the ambient light level AL, and a remote signal portion indicative of the remote signal RS. Typically, the detection signal DS is of I$^2$C type, for example. The light signal portion and the remote signal portion are generated by the first second sensor means, i.e. by the array of photo-diodes and the array of infrared photo-diodes, respectively.

The light signal portion, i.e. the ambient light level AL, indicates the illumination of the room. As mentioned above by using appropriate filters the ambient light level AL can be photopic and/or scotopic. If the illumination (measured in LUX or foot-candles) exceeds a target value for the room, e.g. due to sunlight entering the room or other illumination, the light signal portion is adjusted accordingly. The controller means 22 interprets the detection signal DS or light signal portion and generates a control signal CS' that will be used to adjust the light output of the light source 4. The control signal CS' is received and interpreted by the driver circuit 23 and translated into control signal CS which is used to drive and adjust the light source 4. This way, there is a permanent feedback that automatically adjusts the light source 4 to allow for a constant room lighting.

The light sensor 1 can also sense the (infrared) remote signal RS transmitted from the (IR) remote control unit 3 by a user. Hence, the light sensor 1 can sense a data stream coming from the IR remote control unit 3 which leads to the generation of the remote signal portion of the detection signal DS. The remote signal portion comprises control information sent from the remote control 3 which can be used to adjust the control parameters of the lighting system by means of driver circuit 23. These control parameters could be the target value which is a means of light intensity, a colour temperature, or even control parameter pre-sets that can be chosen or programmed by the user to set different light levels under different conditions like room occupancy being triggered or sunlight being sensed. Such control parameter pre-sets could also account for time, for example providing a different light level in the morning and in the evening.

This remote controlled programming and setting of control parameters is especially useful in commissioning the lighting system at the time of instalment through simple methods that do not require complex programming or access to the high voltage side of the lighting system. The remote control unit 3 can be a simple programmable TV remote control, a PDA or Smartphone or any other mobile device. Computers or locally fixed control units are possible as well. The remote control unit 3 may support three functions: standard IR TV remote (40-60 KHz modulation), inter-lamp IR communication, ILC (with 1 MHz modulation, although this can be lower from 100 KHz upwards) and long distance proximity detection (multiple bands in the >1 MHz area are possible, e.g. 1.1 MHz, 1.35 MHz and 1.65 MHz). The three functions can be supported in a time division multiplex (TDM) manner.

Figure 2:
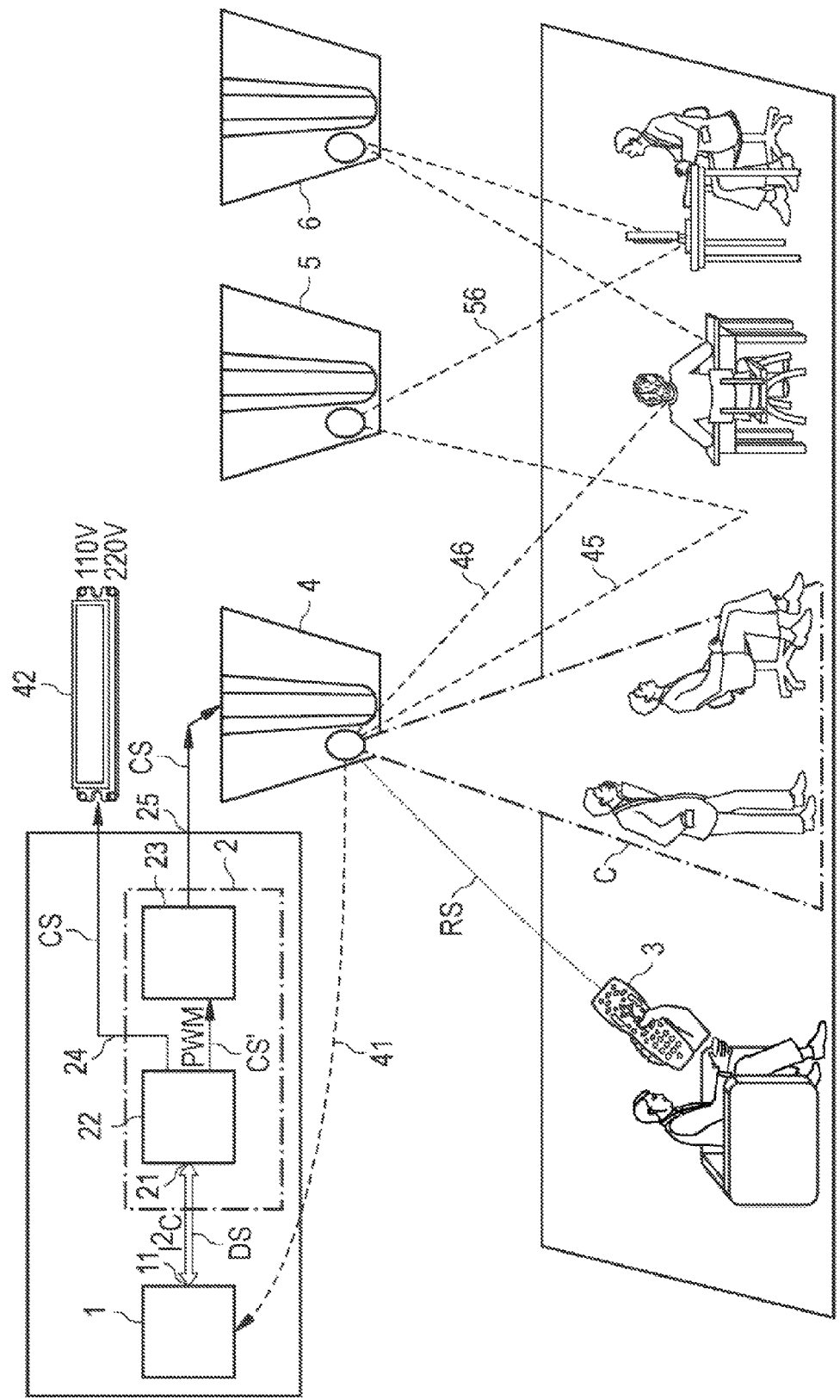
FIG. 2 shows another embodiment of a sensor arrangement for controlling room lighting.

FIG. 2 shows another embodiment of a sensor arrangement for controlling room lighting. In particular, the drawing shows one possible embodiment of communication between several sensor arrangements implemented through light- or inter-light communication.

Generally there is more than just a single light source 4 installed in a room. In this particular example, there are two more light sources 5, 6 which both are also equipped with sensor arrangement modules. Each sensor arrangement comprises a light sensor 1 and a controller 2 as explained above with respect to FIG. 1. In addition, the controller means 22 comprise a light communication interface. A light emitter 7 is connected to the controller means 22 via a communication terminal 71 (see FIG. 3 for further details). The light emitter 7, e.g. a photo-diode, is arranged to emit a light communication signal LCS, which can be detected by means of the light sensors 1 in the modules. For example, the light emitter 7 is an infra-red photo-diode and emits infra-red light which can be detected by the light sensor 1 without being noticeable by the human eye.

The drawing indicates how the inter-light communication works. The sensor arrangement in the first light source 4 is either controlled by means of the remote signal RS or detects the ambient light following normal operation (see FIG. 1 for details). In fact, ambient light is detected from within a certain cone C below the first light source 4. In addition to remote signal control and ambient light detection, inter-light communication can proceed via path 45 to light source 5, and via path 46 to light source 6, etc. (Infrared) light is emitted by light emitter 7 of the first light source 4 and reflected from objects and/or surfaces in the room as indicated in the drawing. This way the remote controlled programming and setting of control parameters can be broadcasted from light source 4 to the other light sources 5, 6. The light communication signal LCS emitted by the light emitter 7 is modulated in order to be distinguishable from the remote signal RS and from ambient light. Preferably, a 1 MHz modulation is used to avoid interference. The range, i.e. length of paths 45, 46 etc., typically lies at 6 m.

The (invisible) light communication can be implemented as a mesh network including master-slave dependencies. This is especially useful in order to avoid oscillation between the controls of more than one light source in the room. The master defines a certain lighting condition and the remaining slaves adjust to this defined lighting condition and do not interpret the adjusted lighting in other light sources as ambient light. Generally, it is possible that a sensor arrangement can dynamically be appointed master in the mesh. For example, the light source closest to the remote control can be master as it receives the remote signal RS with highest intensity. However, if the master is appointed statically, the detection of the remote signal RS by any of the slaves can be relayed to the master by means of inter-light communication as well. Generally, inter-light communication between the sensor arrangements can be bi-directional.

Further to inter-light communication, the light emitter 7 can be used as proximity detector.

Figure 3:
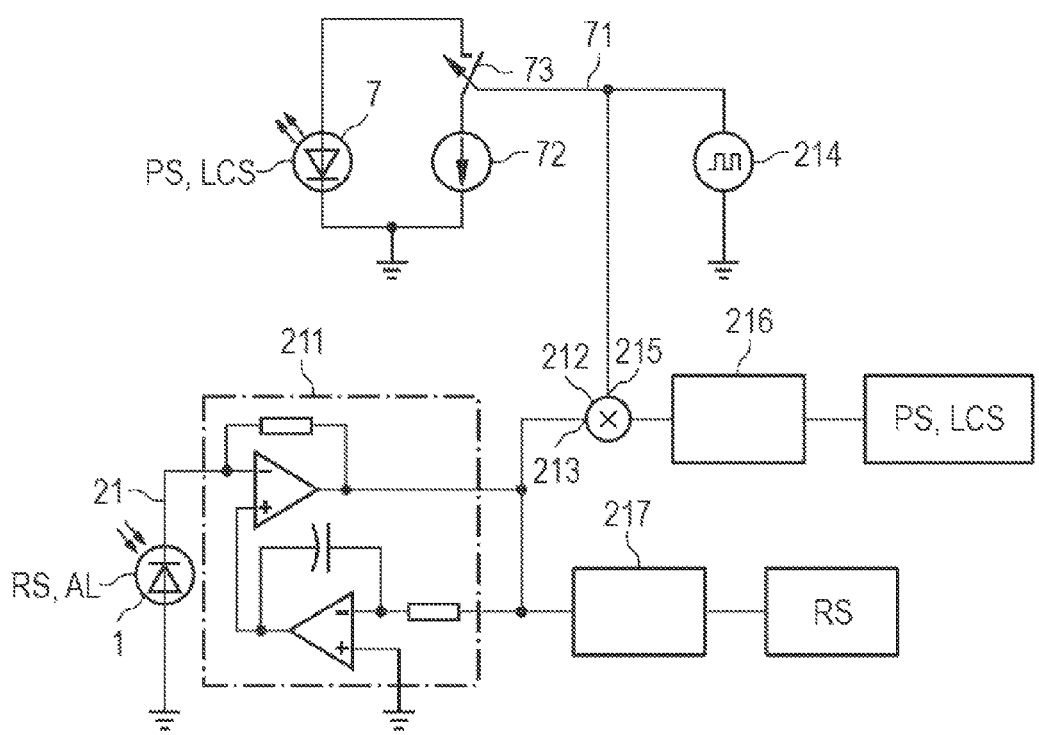
FIG. 3 shows an exemplary circuit diagram of an embodiment of a sensor arrangement for controlling room lighting.

FIG. 3 shows an exemplary circuit diagram of an embodiment of a sensor arrangement for controlling room lighting. In particular, the drawing shows various signal processing components of the controller means 22, in particular, a mixer in order to modulate/demodulate the different types of signals emitted and detected by the sensor arrangement. The light sensor 1 can be used to receive the remote signal RS, detect the level of ambient light AL, detect a proximity signal PS, and receive the light communication signal LCS. On the other side light emitter 7 is used to emit the communication signal to other light sources via light-communication and emit the proximity signal PS.

On the receiving end the light sensor 1 is connected to an integrator 211. The integrator 211 comprises amplifier based integration means, preferably, transconductance amplifiers. The output side of the integrator 211 is connected to a mixer 212 via signal input 213. The mixer 212 is further connected to a local oscillator 214 via communication terminal 215. Finally, the mixer 212 is connected to a low-pass filter 216. The output side of the integrator 211 is also connected to a band-pass filter 217. On the emitting end, the light emitter 7 is connected in parallel to a current source 72. Via a switch 73 the parallel circuit of light emitter 7 and current source 72 is connected to the mixer 212 via its communication terminal 215, and to the local oscillator 214.

The detection and/or emission is realized in a time division manner, i.e. the light sensor 1 and/or light emitter 7 are used to detect/emit the different signals separately and within a defined time interval. This defined time interval can be determined by means of the local oscillator 214.

During a first time interval the ambient light level AL detected by means of the light detector 1. The corresponding detection signal is not modulated and can be recorded by means of a signal integrator. For example, integrator 211 can be used for this purpose and provides a signal proportional to the ambient light level AL (not shown), for example as counts per first time interval. For example, the latter signal can be provided at band pass filter 217.

During a second time interval the remote signal RS can be detected by means of the light detector 1. The remote signal RS can be modulated with a certain frequency. Preferably, the modulation frequency is in the order of 20 to 60 kHz. Within this frequency range the remote signal can be processed without the need of down sampling. Thus, the detected remote signal RS is only filtered by means of band pass filter 217 and can be used for further processing by the controller means 22 (indicated by reference numeral RS in the box). The remote signal RS typically is modulated according to the pulse width modulation standard (PWM) but generally other techniques can be used as well.

During a third time interval the proximity signal PS can be emitted by means of the light emitter 7 and detected by means of the light detector 1. The proximity signal PS is emitted by means of light emitter 7 comprised by the same sensor arrangement module. The proximity signal PS is modulated with a certain frequency. Preferably, the modulation frequency is in the order of some 1 MHz, for example, 1.1 MHz in order to reduce interference. The modulation can be implemented using switch 73 and switching of the same according to the frequency reference of the local oscillator 14. The frequency reference lies in the range of 500 kHz to 2 MHz depending on the desired modulation. The proximity signal PS can be emitted by a single light emitter 7 during the third time interval. However, more than a single light emitter 7 can be implemented in order to allow for simultaneous operation with other detection/emission modes, e.g. light-communication. The detected proximity signal PS is filtered by means of low pass filter 216 and can be used for further processing by the controller means 22 (indicated by reference numeral PS in the box).

During a fourth time interval the light communication signal LCS can be emitted by means of the light emitter 7 and detected by means of the light detector 1. The light communication signal LCS is emitted by means of a light emitter 7 of one sensor arrangement module and to be detected by means of a light detector 1 of a another sensor arrangement module. Thus, modulation of the light communication signal LCS allows to distinguish the signal from any proximity signal PS. Preferably, the modulation frequency is in the order of some 1.5 MHz or higher in order to reduce interference with proximity signal PS. The modulation can be implemented using switch 73 and switching of the same according to the frequency reference of the local oscillator 214. The detected light communication signal LCS is filtered by means of low pass filter 216 and can be used for further processing by the controller means 22 (indicated by reference numeral LCS in the box).

The light communication signal LCS and proximity signal PS are either detected via integrator 211 at signal input 213 or emitted by the light emitter 7 via the communication terminal 215. Generally, the time intervals introduced above are separated but can (partly) overlap. For example, emission via light emitter 7 and detection by light detector 1 can be synchronized.

What is claimed is:

1. A sensor arrangement for controlling room lighting, comprising:
    a light sensor comprising a single sensor, the single sensor arranged for:
        detecting an ambient light level, in particular, arranged for detecting a photopic and/or scotopic ambient light level,
        detecting a remote signal to be emitted by a remote control unit, and
        providing at a sensor terminal a detection signal indicative of the ambient light level and indicative of the remote signal; and
    a controller comprising an input terminal connected to the sensor terminal and comprising a controller means to generate a control signal depending on the detection signal to control a light source to be connected at an output terminal.

2. The sensor arrangement according to claim 1, wherein the detection signal comprises a light signal portion indicative of the ambient light level, and further comprises a remote signal portion indicative of the remote signal.

3. The sensor arrangement according to claim 1 or 2, wherein the controller means is arranged to adjust a light output of the light source depending on the ambient light level with respect to a target value and/or is arranged to adjust control parameters of the light source depending on the remote signal, in particular arranged to adjust the target value, a color temperature, and/or control parameter presets.

4. The sensor arrangement according to claim 3, wherein the controller means comprises a micro-controller and/or control logic.

5. The sensor arrangement according to claim 1, wherein the controller means comprises a driver circuit for light emitting diodes and the light source comprises a light emitting diode or an array of light emitting diodes.

6. The sensor arrangement according to claim 1, wherein the light sensor and the controller are integrated into a common module.

7. The sensor arrangement according to claim 1, further comprising a proximity sensor connected to the controller and providing at the sensor terminal a proximity signal, wherein the controller is arranged to adjust the control parameters depending on the proximity signal.

8. A sensor network for controlling room lighting, comprising a plurality of sensor arrangements according to claim 1, wherein each controller (2) comprises a communication means arranged for a bidirectional communication within the plurality of sensor arrangements.

9. The sensor network according to claim 8, wherein the communication means comprises a visible light communication interface, an infrared light communication interface, a Bluetooth interface, a wireless local area network interface, and/or a universal serial bus.

10. The sensor arrangement according to claim 1, wherein the single sensor is a multispectral sensor comprising different areas configured to sense different wavelengths.

11. The sensor arrangement according to claim 1, wherein the single sensor comprises dedicated spectral filters, such that different areas of the single sensor are covered by different filters.

12. The sensor arrangement according to claim 1, wherein the controller means provides for a permanent feedback that automatically adjusts the light source, to allow for a constant room lighting.

13. A method for controlling room lighting, comprising the steps of:
    detecting, using a single sensor corresponding to a light sensor, an ambient light level, in particular, a photopic and/or scotopic ambient light level, and detecting a remote signal to be emitted by a remote control unit;
    generating a detection signal indicative of the detected ambient light level and indicative of the detected remote signal; and
    providing the detection signal at a controller and generating a control signal depending on the detection signal to control a light source to be connected to the controller.

14. The method according to claim 13, further comprising the steps of:
    adjusting a light output of the light source depending on the control signal with respect to a target value; and/or
    adjusting control parameters of the light source-depending on the control signal, in particular adjusting the target value, a color temperature, and/or control parameter presets.

15. The method according to claim 13 or 14, further comprising adjusting the control parameters depending on a proximity signal received from a proximity sensor and provided at the controller.

16. The method according to claim 13, further comprising the steps of receiving and broadcasting the control parameters to at least one further controller coupled to the controller by means of a network designed for a bidirectional communication to the at least one further controller, in particular designed for a visible light communication, an infrared light communication, communication via Bluetooth, a wireless local area network, and/or a universal serial bus.

* * * * *